(12) United States Patent
Bauer et al.

(10) Patent No.: US 10,894,568 B2
(45) Date of Patent: Jan. 19, 2021

(54) FLOW-GUIDING ARRANGEMENT

(71) Applicant: Dr. Ing. h.c. F. Porsche Aktiengesellschaft, Stuttgart (DE)

(72) Inventors: Riccardo Bauer, Owen (DE); Tobias Posch, Wimsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 6 days.

(21) Appl. No.: 16/384,969

(22) Filed: Apr. 16, 2019

(65) Prior Publication Data

US 2019/0382061 A1  Dec. 19, 2019

(30) Foreign Application Priority Data

Jun. 18, 2018 (DE) .......................... 10 2018 114 527

(51) Int. Cl.
*B62D 35/00* (2006.01)
*B62D 37/02* (2006.01)

(52) U.S. Cl.
CPC ........... *B62D 35/007* (2013.01); *B62D 37/02* (2013.01)

(58) Field of Classification Search
CPC ............................. B62D 35/007; B62D 37/02
USPC ...................................................... 296/180.1
See application file for complete search history.

(56) References Cited

U.S. PATENT DOCUMENTS

| 3,952,823 A * | 4/1976 | Hinderks .............. F01N 13/082 180/309 |
| 2016/0229285 A1* | 8/2016 | Rutschmann ....... F02B 29/0431 |
| 2017/0158261 A1 | 6/2017 | Fahland et al. |
| 2017/0361882 A1* | 12/2017 | Weber ..................... B62D 37/02 |
| 2018/0319269 A1* | 11/2018 | Weber ................. F02B 29/0431 |

FOREIGN PATENT DOCUMENTS

| DE | 602005000654 T2 | 11/2007 | |
| DE | 102016122493 A1 | 6/2017 | |
| DE | 102016005471 A1 | 11/2017 | |
| DE | 102018000242 A1 * | 7/2019 | .......... B62D 35/007 |
| DE | 102018208749 A1 * | 12/2019 | .......... B62D 35/007 |
| EP | 1593565 A1 * | 11/2005 | .............. B60S 1/528 |
| GB | 2502963 A * | 12/2013 | .......... B60K 11/085 |
| WO | WO-2011076428 A2 * | 6/2011 | .............. B64C 9/16 |

* cited by examiner

*Primary Examiner* — Hilary L Gutman
(74) *Attorney, Agent, or Firm* — Leydig, Voit & Mayer, Ltd.

(57) ABSTRACT

A flow-guiding arrangement for a motor vehicle includes: a wing arrangement, which is arranged in a rear-end region of the motor vehicle and has a wing element, and an underflow duct with a duct inlet and a duct outlet. The duct inlet is arranged upstream of the wing element and the duct outlet is arranged below the wing arrangement. The underflow duct is fluidically assigned a throttle device, which is configured to be actuated by a motor and via which an effective flow cross section of the underflow duct is to be varied.

10 Claims, 4 Drawing Sheets

FLOW-GUIDING ARRANGEMENT

CROSS-REFERENCE TO RELATED APPLICATIONS

Priority is claimed to German Patent Application No. DE 10 2018 114 527.6, filed on Jun. 18, 2018, the entire disclosure of which is hereby incorporated by reference herein.

FIELD

The invention relates to a flow-guiding arrangement for a motor vehicle, having a wing arrangement arranged in the rear-end region of the motor vehicle.

BACKGROUND

DE 10 2016 005 471 A1 discloses a flow-guiding arrangement having a wing arrangement, which is arranged in the rear-end region of the motor vehicle, has a wing element, and has an underflow duct with a duct inlet and a duct outlet. The duct inlet is arranged upstream of the wing element and the duct outlet is arranged below the wing arrangement. The duct inlet is arranged on a top side of a retaining element of the wing arrangement, and the duct outlet is arranged on a bottom side of the retaining element. A part of the air flowing in along the vehicle rear-end region is conducted via the underflow duct to the bottom side of the wing arrangement, with the result that the flow-guiding arrangement can generate a downforce at a vehicle rear axle.

SUMMARY

An embodiment of the present invention provides a flow-guiding arrangement for a motor vehicle that includes: a wing arrangement, which is arranged in a rear-end region of the motor vehicle and has a wing element, and an underflow duct with a duct inlet and a duct outlet. The duct inlet is arranged upstream of the wing element and the duct outlet is arranged below the wing arrangement. The underflow duct is fluidically assigned a throttle device, which is configured to be actuated by a motor and via which an effective flow cross section of the underflow duct is to be varied.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
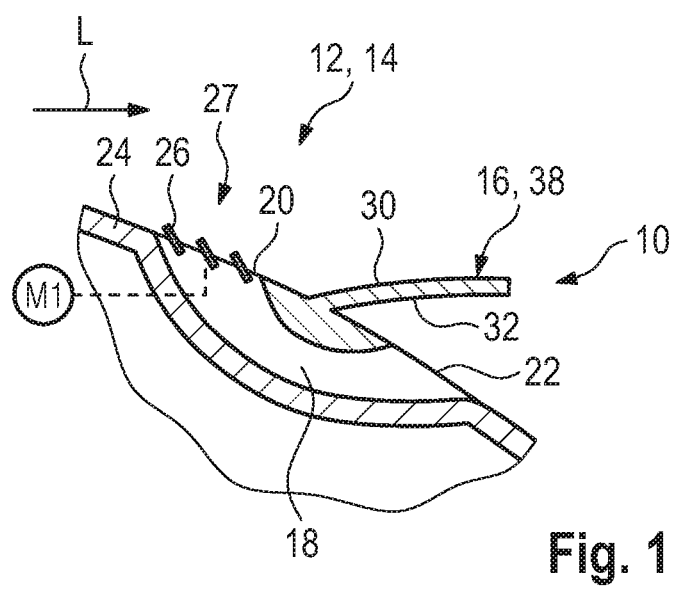
FIG. 1 shows, in a highly simplified and sectioned illustration, a detail of a motor vehicle rear-end region with a first exemplary embodiment of a flow-guiding arrangement according to the invention.

Embodiments of the present invention provide a flow-guiding arrangement that effectively generates, at the vehicle rear axle, a downforce that is able to be adapted to different driving situations.

The flow-guiding arrangement according to an embodiment of the invention has a wing arrangement that is arranged in the rear-end region of the motor vehicle. The wing arrangement includes a wing element that is formed such that a downforce at the vehicle rear axle can be generated by a flow around the wing element.

The flow-guiding arrangement also has an underflow duct with a duct inlet and a duct outlet. The duct inlet is arranged upstream of the wing element, and the duct outlet is arranged below the wing arrangement. In this case, the term "below" encompasses a bottom side of the wing arrangement. That is to say, the duct outlet can, in the extreme case, be arranged on the bottom side of the wing arrangement. A part of the air flowing in along the vehicle rear-end region can be conducted via the underflow duct to the bottom side of the wing arrangement. In this case, the fraction of the quantity of air conducted to the bottom side of the wing arrangement is determined via the effective flow cross section of the underflow duct.

According to the invention, the underflow duct is fluidically assigned a throttle device, which is able to be actuated by motor, preferably is able to be actuated by electric motor, and via which the effective flow cross section of the underflow duct is able to be varied. It is thus possible via the throttle device for the quantity of air conducted to the bottom side of the wing arrangement to be varied, whereby the flow conditions at the top side and in particular at the bottom side of the wing arrangement are varied. In particular, the flow conditions at the wing element of the wing device are varied. With an open underflow duct, a substantially laminar flow around the wing element can be obtained, while, with a closed underflow duct, a partly turbulent flow can be obtained. This allows adaptation of the downforce generated by the flow-guiding arrangement and of the other aerodynamic properties of the motor vehicle to different driving situations.

Preferably, the wing arrangement is formed integrally with a vehicle body. This allows simple and reliable fastening of the wing arrangement to the vehicle body, which, even in the case of high loading by the acting air pressure, permits a reliable function of the wing arrangement and thus of the flow-guiding arrangement.

According to a preferred configuration, the underflow duct is formed in a simple manner within the vehicle body, whereby an undisturbed overall appearance of the wing arrangement is maintained.

Alternatively, the underflow duct is formed in a retaining element of the wing arrangement. Here, the duct inlet is arranged on a retaining element top side and the duct outlet is arranged on a retaining element bottom side. It is thus not necessary to provide installation space in the vehicle body for the underflow duct.

Preferably, the throttle device, which is able to be actuated by a motor, has at least one flap, which is able to be pivoted by a motor. Particularly preferably, the throttle device has multiple flaps, which extend substantially transversely with respect to a vehicle longitudinal direction, and which are arranged on the duct inlet, and which are able to be pivoted via an electric motor.

According to a preferred configuration, the wing arrangement and the underflow duct are fluidically combined with a spoiler device which is arranged in the rear-end region of the motor vehicle below the duct outlet. The additional spoiler device allows an additional generation of downforce at the vehicle rear axle. In this configuration, it is possible via the throttle device for the incident flow ratio between the wing arrangement and the spoiler device to be varied, whereby a change in the generated overall downforce over a particularly wide range of values is made possible.

Preferably, the wing arrangement has a wing element, which is able to be moved by a motor and/or the spoiler device has a spoiler element which is able to be moved by a motor. In this way, an additional setting possibility for the downforce generated by the flow arrangement is provided, whereby the downforce is able to be set particularly precisely and over a wide range of downforces.

Exemplary embodiments of the invention will be discussed in more detail below on the basis of the appended figures.

FIG. 1 shows a first exemplary embodiment of a flow-guiding arrangement 10 according to the invention, which is arranged in a rear-end region 12 of a motor vehicle 14. The flow-guiding arrangement 10 includes a wing arrangement 16 having a wing element 38, and an underflow duct 18 having a duct inlet 20 and a duct outlet 22. In the present exemplary embodiment, the wing arrangement 16 is formed integrally with a vehicle body 24.

The underflow duct 18 is formed in the vehicle body 24. The duct inlet 20 is arranged above the wing arrangement 16, in particular upstream of the wing element 38, and the duct outlet 22 is arranged below the wing arrangement 16.

Multiple pivotable flaps 26 are arranged in the duct inlet 20 of the underflow duct 18 and form a throttle device 27. The flaps 26 extend substantially in a vehicle transverse direction Q and are arranged adjacent to one another in the duct inlet 20 along a vehicle longitudinal direction L.

Figure 2:
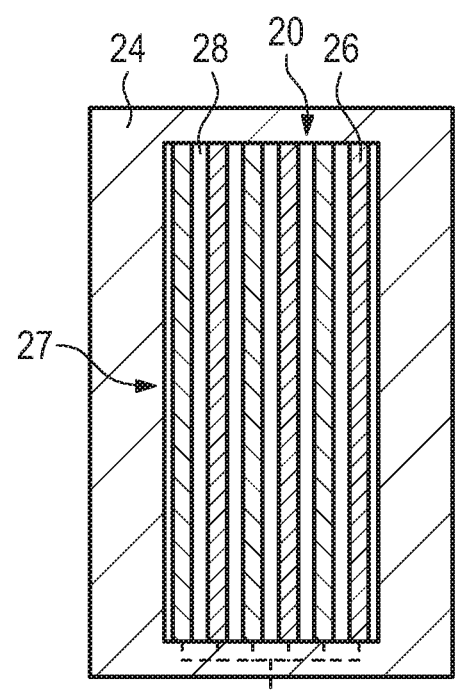
FIG. 2 shows a schematic plan view of an open duct inlet of an underflow duct of the flow-guiding arrangement in FIG. 1.
Figure 2:
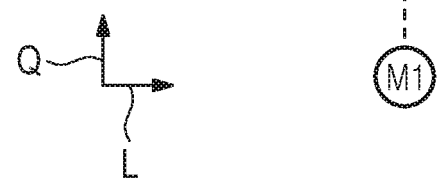
Figure 3:
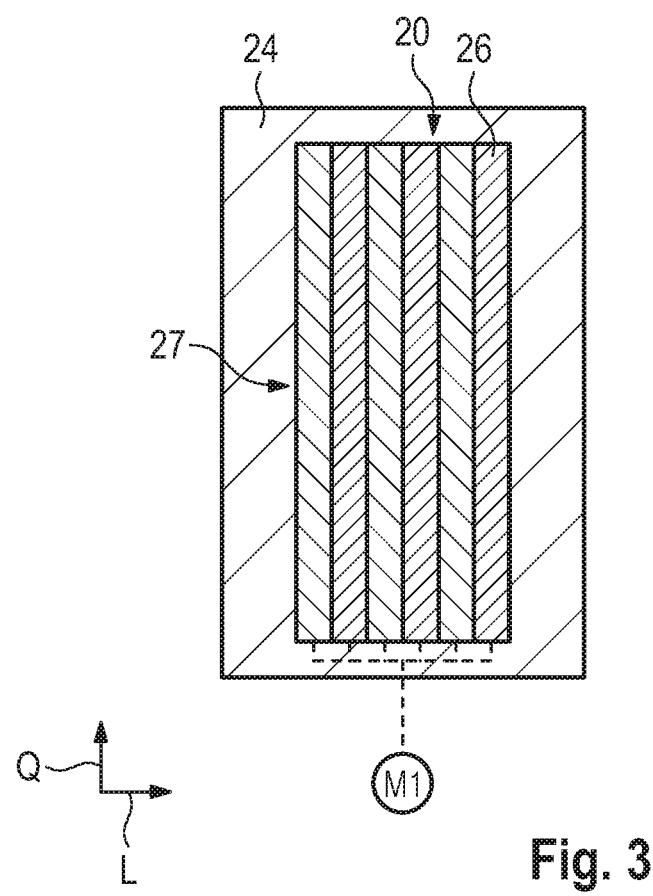
FIG. 3 shows the duct inlet in FIG. 2 in the closed position.

The throttle device 27 is able to be adjusted via a first electric motor M1 between an open position, illustrated in FIG. 2, and a closed position, illustrated in FIG. 3, in order to vary an effective flow cross section of the underflow duct 18. In the open position, the intermediate spaces 28 between the flaps 26 define a maximum effective flow cross section. In the closed position, the throttle device 27 closes off the duct inlet 20 substantially completely, whereby a minimum effective flow cross section of substantially zero is the result.

Via the throttle device 27, the effective flow cross section of the underflow duct 18 can be varied substantially steplessly between the minimum effective flow cross section and the maximum effective flow cross section. In this way, it is possible for the flow conditions at a wing element top side 30 and at a wing element bottom side 32, and thus the downforce generated by the flow arrangement at a vehicle rear axle 34, to be varied by electric motor.

Figure 4:
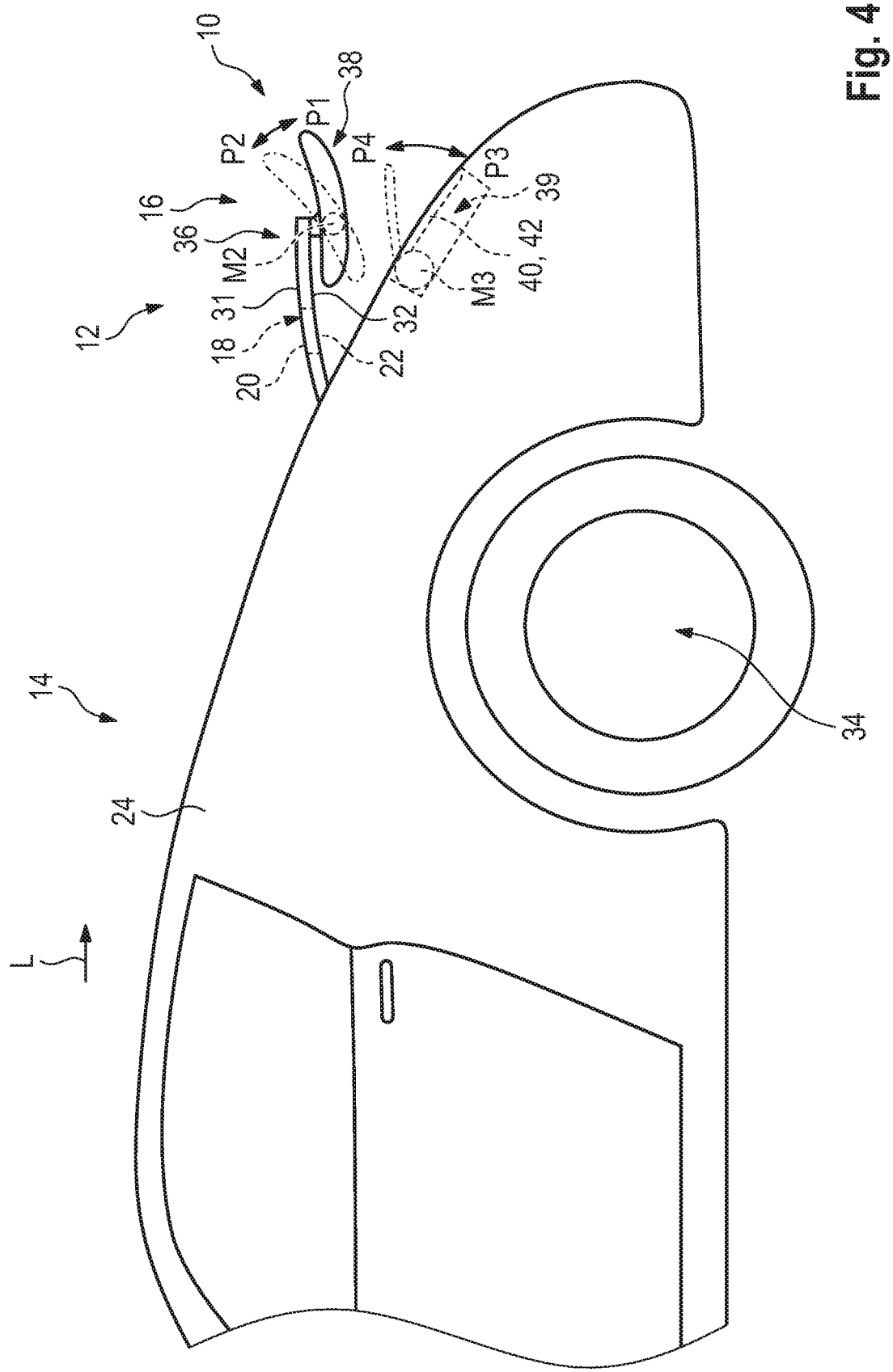
FIG. 4 shows a side view of a motor vehicle rear-end region with a second exemplary embodiment of a flow-guiding arrangement according to the invention, in which the underflow duct is formed in the wing arrangement and an additional spoiler device is arranged below the wing arrangement.

FIG. 4 shows a second exemplary embodiment of a flow arrangement according to the invention, where the same reference signs are used for components having substantially the same function.

The flow arrangement 10 shown in FIG. 4 has an alternative wing arrangement 16, with an immovable retaining element 36 and a movable wing element 38. The wing element 38 is arranged pivotably on a self-supporting distal end of the retaining element 36 and is able to be moved via a second electric motor M2 between a first setting position P1 and a second setting position P2 in order to vary the downforce generated by the flow arrangement 10.

Figure 5:
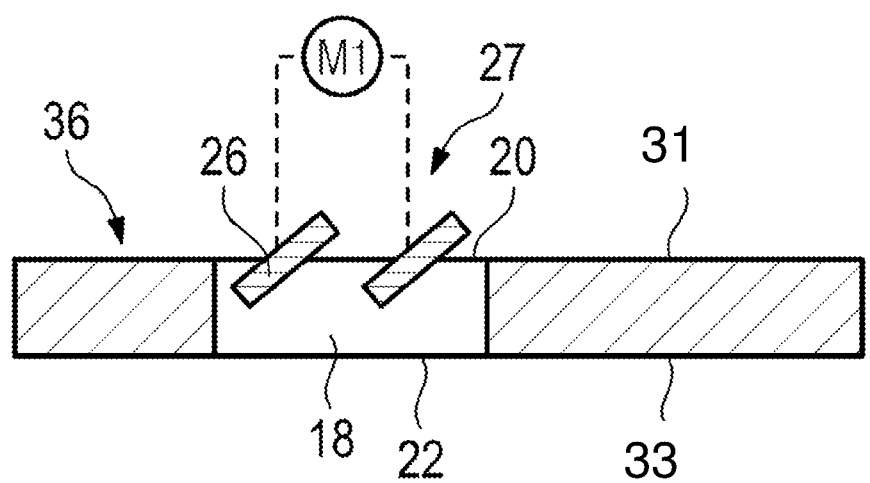
FIG. 5 shows a schematic cross section of a retaining element of a wing arrangement of the flow arrangement in FIG. 4 with an underflow duct, which is formed in the retaining element.

As illustrated schematically in FIG. 5, the underflow duct 18 is formed in the retaining element 36 of the wing arrangement 16, where the duct inlet is arranged on the retaining element top side 31 upstream of the wing element 38 and the duct outlet 22 is arranged on the retaining element bottom side 33. Multiple pivotable flaps 26 are arranged in the underflow duct 18 and form the throttle device 27, the latter being able to be actuated by electric motor via the electric motor M1.

Below the wing arrangement 16 and thus below the duct outlet 22, there is arranged in the vehicle body 24 of the motor vehicle 14 a spoiler recess 39 in which a spoiler element 40 is pivotably attached, which spoiler element forms a spoiler device 42 in the present exemplary embodiment. The spoiler device 42 is able to be moved by motor via a third electric motor M3, which is arranged in the spoiler recess 39 in the present exemplary embodiment, between a rest position P3 and a working position P4 in order to vary the downforce generated by the flow arrangement 10. Devices (not illustrated in any more detail) for supporting the spoiler device 42 in the rest position P3 may be provided in the spoiler recess 39.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A flow-guiding arrangement for a motor vehicle, the flow-guiding arrangement comprising:

a wing arrangement, which is arranged in a rear-end region of the motor vehicle and has a wing element, and an underflow duct with a duct inlet and a duct outlet, wherein the duct inlet is arranged upstream of the wing element and the duct outlet is arranged below the wing arrangement, wherein the underflow duct is fluidically assigned a throttle device, which is configured to be actuated by a motor and via which an effective flow cross section of the underflow duct is to be varied, and wherein the throttle device has at least one flap, which is configured to be pivoted by the motor between a fully closed position and a fully opened position, wherein in the fully closed position the flap is configured to close off the duct inlet substantially completely whereby the effective cross flow section of the underflow is substantially zero.

2. The flow-guiding arrangement as claimed in claim 1, wherein the wing arrangement is integral with a vehicle body of the motor vehicle.

3. The flow-guiding arrangement as claimed in claim 2, wherein the underflow duct is within the vehicle body.

4. The flow-guiding arrangement as claimed in claim 1, wherein the underflow duct is in a retaining element of the wing arrangement, and wherein the duct inlet is arranged on a retaining element top side and the duct outlet is arranged on a retaining element bottom side.

5. The flow-guiding arrangement as claimed in claim 1, wherein the wing arrangement and the underflow duct are fluidically combined with a spoiler device which is arranged in the rear-end region of the motor vehicle below the duct outlet.

6. The flow-guiding arrangement as claimed claim 1, wherein the wing element has a wing that is configured to be moved by a wing motor.

7. The flow-guiding arrangement as claimed in claim 5, wherein the spoiler device has a spoiler that is configured to be moved by a spoiler motor.

8. The flow-guiding arrangement as claimed in claim 4, wherein the retaining element is immovable, fixed at a vehicle body at a first end, and extends away from the vehicle body from the first end to a distal end, and wherein the wing element is moveably coupled to the distal end of the retaining element.

9. The flow-guiding arrangement as claimed in claim 1, wherein the throttle device comprises a plurality of flaps, which comprise the at least one flap, wherein each of the flaps extends lengthwise in a vehicle transverse direction, and the flaps are arranged adjacent to one another in the duct inlet along a vehicle longitudinal direction.

10. The flow-guiding arrangement as claimed in claim 9, wherein the plurality of flaps are configured as shutters.

* * * * *